United States Patent
Long et al.

(10) Patent No.: US 8,903,084 B2
(45) Date of Patent: *Dec. 2, 2014

(54) EFFICIENT KEY DERIVATION FOR END-TO-END NETWORK SECURITY WITH TRAFFIC VISIBILITY

(71) Applicant: Intel Corporation, Santa Clara, CA (US)

(72) Inventors: Men Long, Hillsboro, OR (US); Jesse Walker, Portland, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,027

(22) Filed: Jun. 12, 2013

(65) Prior Publication Data

US 2014/0032905 A1 Jan. 30, 2014

Related U.S. Application Data

(63) Continuation of application No. 12/327,137, filed on Dec. 3, 2008, now Pat. No. 8,467,527.

(51) Int. Cl.
*H04L 9/00* (2006.01)
*H04L 9/08* (2006.01)
*G06F 7/04* (2006.01)
*G06F 21/00* (2013.01)
*H04L 29/06* (2006.01)
*H04L 9/06* (2006.01)

(52) U.S. Cl.
CPC ....... *H04L 63/0428* (2013.01); *H04L 2209/125* (2013.01); *H04L 9/0866* (2013.01); *H04L 9/0631* (2013.01)
USPC ............. 380/44; 380/277; 380/278; 380/279; 726/2; 726/3; 726/4; 713/183

(58) Field of Classification Search
CPC ........... H04L 9/08; H04L 9/30; H04L 9/0883; G06F 21/31
USPC .............. 380/44, 277–279; 726/2–4; 713/183
See application file for complete search history.

(56) References Cited

U.S. PATENT DOCUMENTS 6,167,136 A 12/2000 Chou
6,963,976 B1 11/2005 Jutla
(Continued)

FOREIGN PATENT DOCUMENTS

CN 1697373 A 11/2005
CN 101043335 A 9/2007
(Continued)

OTHER PUBLICATIONS

Ashwood, Joseph, "AES based Key Derivation Function" webpage available at: "http://www.derkeiler.com/Newsgroups/sci.crypt/2008-02/msg00670.html," Feb. 18, 2008, 1 page.

(Continued)

*Primary Examiner* — Teshome Hailu
(74) *Attorney, Agent, or Firm* — Garrett IP, LLC

(57) ABSTRACT

Both end-to-end security and traffic visibility may be achieved by a system using a controller that derives a cryptographic key that is different for each client based on a derivation key and a client identifier that is conveyed in each data packet. The controller distributes the derivation key to information technology monitoring devices and a server to provide traffic visibility. For large key sizes, the key may be derived using a derivation formula as follows:

$$\text{client\_key\_MSB} = \text{AES128}(\text{base\_key\_1}, \text{client\_ID}), \quad (1)$$

$$\text{client\_key\_LSB} = \text{AES128}(\text{base\_key\_2}, \text{client\_ID} + \text{pad}), \text{and} \quad (2)$$

client_key=client_key_MSB||client_key_LSB, where (1) and (2) are executed in parallel. The client key and a client identifier may be used so that end-to-end security may be achieved.

13 Claims, 7 Drawing Sheets

(56) References Cited

U.S. PATENT DOCUMENTS

| | | | |
|---|---|---|---|
| 6,983,366 | B1 | 1/2006 | Huynh et al. |
| 7,007,163 | B2 * | 2/2006 | Tardo et al. ............ 713/164 |
| 7,055,027 | B1 | 5/2006 | Gunter et al. |
| 7,093,126 | B1 | 8/2006 | Jutla |
| 7,110,545 | B2 | 9/2006 | Furuya et al. |
| 7,178,025 | B2 * | 2/2007 | Scheidt et al. ............ 713/168 |
| 7,188,365 | B2 | 3/2007 | Balissat et al. |
| 7,231,517 | B1 | 6/2007 | Mashayekhi |
| 7,266,703 | B2 | 9/2007 | Anand et al. |
| 7,281,128 | B2 | 10/2007 | Mikel et al. |
| 7,373,826 | B2 | 5/2008 | Weber et al. |
| 7,448,081 | B2 | 11/2008 | Balissat et al. |
| 7,487,365 | B2 | 2/2009 | England et al. |
| 7,490,350 | B1 | 2/2009 | Murotake et al. |
| 7,543,142 | B2 | 6/2009 | Sydir et al. |
| 7,685,434 | B2 | 3/2010 | Kaniz et al. |
| 7,725,719 | B2 | 5/2010 | Sandberg et al. |
| 7,797,745 | B2 | 9/2010 | Han et al. |
| 7,900,042 | B2 | 3/2011 | Hall et al. |
| 8,015,211 | B2 | 9/2011 | Marceau et al. |
| 8,107,397 | B1 | 1/2012 | Bagchi et al. |
| 8,245,033 | B1 | 8/2012 | Shetty et al. |
| 8,467,527 | B2 | 6/2013 | Long et al. |
| 2003/0018891 | A1 * | 1/2003 | Hall et al. ............ 713/160 |
| 2003/0131245 | A1 | 7/2003 | Linderman |
| 2003/0191963 | A1 | 10/2003 | Balissat et al. |
| 2003/0200463 | A1 | 10/2003 | McCabe |
| 2004/0202317 | A1 * | 10/2004 | Demjanenko et al. ......... 380/28 |
| 2005/0025091 | A1 | 2/2005 | Patel et al. |
| 2005/0100161 | A1 * | 5/2005 | Husemann et al. ......... 380/200 |
| 2005/0154873 | A1 | 7/2005 | Cam-Winget et al. |
| 2005/0198531 | A1 | 9/2005 | Kaniz et al. |
| 2007/0118896 | A1 | 5/2007 | Soejima et al. |
| 2007/0180227 | A1 | 8/2007 | Akimoto |
| 2007/0245147 | A1 | 10/2007 | Okeya |
| 2007/0277231 | A1 | 11/2007 | Medvinsky et al. |
| 2008/0022356 | A1 | 1/2008 | Tanaka et al. |
| 2008/0192928 | A1 | 8/2008 | Yu et al. |
| 2008/0192930 | A1 | 8/2008 | Balissat et al. |
| 2008/0219445 | A1 | 9/2008 | Yato et al. |
| 2008/0244268 | A1 | 10/2008 | Durham et al. |
| 2008/0260163 | A1 | 10/2008 | Yushiya |
| 2009/0013374 | A1 | 1/2009 | Tsai |
| 2009/0119510 | A1 | 5/2009 | Long et al. |
| 2009/0210699 | A1 * | 8/2009 | Grewal et al. ............ 713/155 |
| 2009/0214026 | A1 * | 8/2009 | Gueron et al. ............ 380/29 |
| 2010/0135498 | A1 | 6/2010 | Long et al. |
| 2010/0211790 | A1 | 8/2010 | Zhang |
| 2010/0281539 | A1 | 11/2010 | Burns et al. |
| 2011/0055585 | A1 * | 3/2011 | Lee ............................. 713/183 |
| 2012/0016977 | A1 | 1/2012 | Robertson et al. |
| 2012/0042164 | A1 | 2/2012 | Gagnon et al. |
| 2012/0096270 | A1 | 4/2012 | Long et al. |
| 2012/0182884 | A1 | 7/2012 | Pyatkovskiy et al. |
| 2013/0097692 | A1 | 4/2013 | Cooper et al. |
| 2014/0115702 | A1 | 4/2014 | Li et al. |

FOREIGN PATENT DOCUMENTS

| | | |
|---|---|---|
| CN | 101335621 A | 12/2008 |
| EP | 1699204 A1 | 9/2006 |
| GB | 2447552 A | 9/2008 |
| JP | 08-204702 A | 8/1996 |
| JP | 2007-526718 A | 9/2007 |
| JP | 2007-288514 A | 11/2007 |
| JP | 2008-219454 A | 9/2008 |
| WO | 2007/108651 A1 | 9/2007 |
| WO | 2014/063050 A1 | 4/2014 |

OTHER PUBLICATIONS

European Search Report for Application No. 09252688.8, mailed on May 3, 2011, 4 pages.
McAfee Firewall Enterprise (Sidewinder) Administration Guide Version 7.0.1.02 Issued Mar. 2009, 744 pages.
McAfee Network Security Platform 7.0, IPS Administration Guide Revision B, Copyright 2012, McAfee, 431 pages.
"Schannel", COM and Security Packages. Microsoft 2012. 6 pages. Retrieved on Oct. 18, 2012 available on: http://msdn.microsoft.com/en-us/library/windows/desktop/ms678421(v=vs.85).aspx.
"SSL—OpenSSL SSL/TLS library" Cryptography and SSL/TLS Toolkit 15 pages. Retrieved on Oct. 18, 2012 available on: http://www.openssl.org/docs/ssl/ssl.html#API_FUNCTIONS.
Extended European Search Report for European Patent Application No. 08253608.7, Mailed on Jun. 11, 2012, 6 pages.
Office Action received for European Patent Application No. 09252688.8, mailed on May 10, 2011, 8 pages.
Notice of Allowance Received for Chinese Patent Application No. 200810170453.3, Mailed on Feb. 24, 2012, 4 pages including 2 pages of English translation.
Office Action Received for Chinese Patent Application No. 200810170453.3, mailed on Nov. 9, 2010, 6 pages of Office Action including 3 pages of English translation.
Office Action Received for Chinese Patent Application No. 200810170453.3, Mailed on Sep. 27, 2011, 5 pages of Office Action including 2 pages of English translation.
Office Action Received for Chinese Patent Application No. 200810170453.3, mailed on May 18, 2011, 3 pages of Office Action and 1 page of English Translation.
Office Action Received for Japanese Patent Application No. 2008-284424, mailed on Aug. 2, 2011, 13 pages of Office Action including 7 pages of English Translation.
Office Action Received for Japanese Patent Application No. 2008-284424, mailed on Nov. 29, 2011, 7 pages of Office Action and 4 pages of English Translation.
Office Action Received for Chinese Patent Application No. 200910259050.0 mailed on Jan. 30, 2013, 18 Pages of Office Action including 13 pages of English Translation.
Office Action received for Chinese Patent Application No. 200910259050.0, mailed on Jun. 26, 2012, 26 pages of Office Action and 17 pages of English Translation.
Office Action Received for Japanese Patent Application No. 2009-271249, mailed on May 7, 2012, 6 pages of Office Action and 3 pages of English Translation.
Notice of Allowance Received for Japanese Application No. 2009-271249, mailed on Sep. 24, 2012, 6 pages of Notice of Allowance including 3 pages of English Translation.
Ashwood, Joseph, "AES Based Key Derivation Function," p. 1—XP007918326, posted on the Internet Feb. 19, 2008.
Black, J., "Authenticated Encryption" "Department of Computer Science, Aug. 19, 2004 available at: http://www.cs.colorado.edu/~jrblack/papers/ae.pdf", 12 pages.
Choi et al., "Low-Power AES Design Using Parallel Architecture" Convergence and Hybrid Information Technology 2008. ICHIT '08. International conference on, IEEE, Piscataway, NJ, USA Aug. 28, 2008, pp. 413-416.
Dierks et al., "The TLS Protocol Version 1.0." Network Working Group. The Internet Society. Jan. 1999, 75 pages.
Dierks et al., "The Transport Layer Security (TLS) Protocol Version 1.2" Network Working Group. The IETF Trust. Aug. 2008, 98 pages. Retrieved on Oct. 26, 2012 at: http://www.ietf.org/rfc/rfc5246.txt.
Dworkin, Morris, "Recommendation for Block Cipher Modes of Operation: Galois/Counter Mode (GCM) for Confidentiality and Authentication", NIST Special Publication 800-38D (DRAFT) Apr. 2006, 23 pages.
Freier et al. "The Secure Sockets Layer (SSL) Protocol Version 3.0." Internet Engineering Task Force. Aug. 2011, 67 pages. Retrieved on Oct. 26, 2012 at: http://tools.ietf.org/html/rfc6101.
Grewal et al. "Wrapped Encapsulating Security Payload (ESP) for Traffic Visibility." Internet Engineering Task Force. Apr. 2010, 15 pages. Retrieved on Oct. 26, 2012 at: http://tools.ietf.org/html/rfc5840.
Huang, C. et al. "The FPGA Implementation of 128-bits AES Algorithm Based on Four 32-bits Parallel Operation" First International Symposium on Data, Privacy and E-Commerce, Section 5 of the text:128-bit AES implementation, 1 page, Nov. 1, 2007.

(56) References Cited

OTHER PUBLICATIONS

IEEE Standard for Local and Metropolitan Area Networks: Media Access Control (MAC) Security, IEEE Std 802.1AE-2006, Aug. 18, 2006 154 pages.

McGrew et al. "The Galois/Counter Mode of Operation (GCM)", May 31, 2005, 44 pages.

McGrew et al. The Use of Galois Message Authentication Code (GMAC) in IPsec ESP and AH RFC 4543, May 2006, pp. 15.

Lee, Thomas. "Authentication Functions." Microsoft 2012. 25 pages. Retrived on Oct. 26, 2012 at: http://msdn.microsoft.com/en-us/library/windows/desktop/aa374731(v=vs.85).aspx.

Viega et al., "The Use of Galois/Counter Mode (GCM) in IPsec Encapsulating Security Payload (ESP)", RFC 4106, Jun. 2005, pp. 11.

International Search Report and Written Opinion received for PCT Application No. PCT/US2013/065680, mailed on Jan. 28, 2014, 11 pages.

Office Action Received for Japanese Patent Application No. 2008-284424, Mailed on Jul. 22, 2011, 7 pages of English Translation and 6 pages of Japanese Office Action.

Office Action received for Chinese Patent Application No. 201210144490.3, mailed on Sep. 27, 2013, 4 pages of English Translation and 5 pages of Chinese Office Action.

Final Office Action Received for U.S. Appl. No. 13/656,406, dated Jun. 27, 2014.

Second Office Action Received for Chinese Patent Application No. 201210144490.3, dated May 16, 2014.

* cited by examiner

EFFICIENT KEY DERIVATION FOR END-TO-END NETWORK SECURITY WITH TRAFFIC VISIBILITY

CROSS-REFERENCE TO RELATED APPLICATIONS

This application is a continuation of U.S. patent application Ser. No. 12/327,137, filed on Dec. 3, 2008, which is related to U.S. patent application Ser. No. 11/731,562, filed on Mar. 30, 2007, entitled "End-to-End Network Security with Traffic Visibility" and is also related to U.S. patent application Ser. No. 11/935,783, filed on Nov. 6, 2007, and entitled "End-to-End Network Security with Traffic Visibility".

BACKGROUND

Many network security protocols depend on negotiating session keys between clients and servers using expensive asymmetric cryptography and then requiring servers to keep track of a large number of symmetric keys negotiated for each client session. End-to-end security means that there is data authenticity and/or confidentiality of data from one side of a communication in the network all the way to the other side, e.g., client-to-server and server-to-client. Traffic visibility means that servers and information technology (IT) monitoring devices can view the secured traffic. To some degree, these two goals oppose one another, but both are important for network security.

End-to-end security is important for both clients and servers in order to exclude third parties from tampering with traffic between the client and server, where the client is the most exposed to direct manipulation or tampering. Thus, the uniqueness of the client's secrets is paramount to prevent the compromise of one client from gaining access to the traffic of other clients. Traffic visibility is vital to the IT administration and requires the IT administration to observe traffic to detect abnormal phenomenon. Many current major security protocols only provide end-to-end security without concern for traffic visibility.

Recently, for efficiency, the industry has been moving towards single-key combined mode cipher for both packet encryption and authentication. The Advanced Encryption Standard (AES) specified by the US NIST is the de facto method for most network security protocols. For instance, AES-GCM (Galois-field and Counter Mode) is recommended to be the scheme for the IPsec protocol. US NIST and NSA provide guidance for the choice of key sizes. For the majority of applications today, a 128-bit key with AES128 operation is used. However, in the future, for applications of higher-level of security, a 256-bit key with AES256 operation might be required. With today's methods, the latency of key derivation for the 256-bit key with AES256 operation is much longer than it is for key derivation for the 128-bit key with AES128 operation. A traditional method of key derivation is a serial operation by iterative the one-way hash function, which is slower in hardware.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Figure 1:
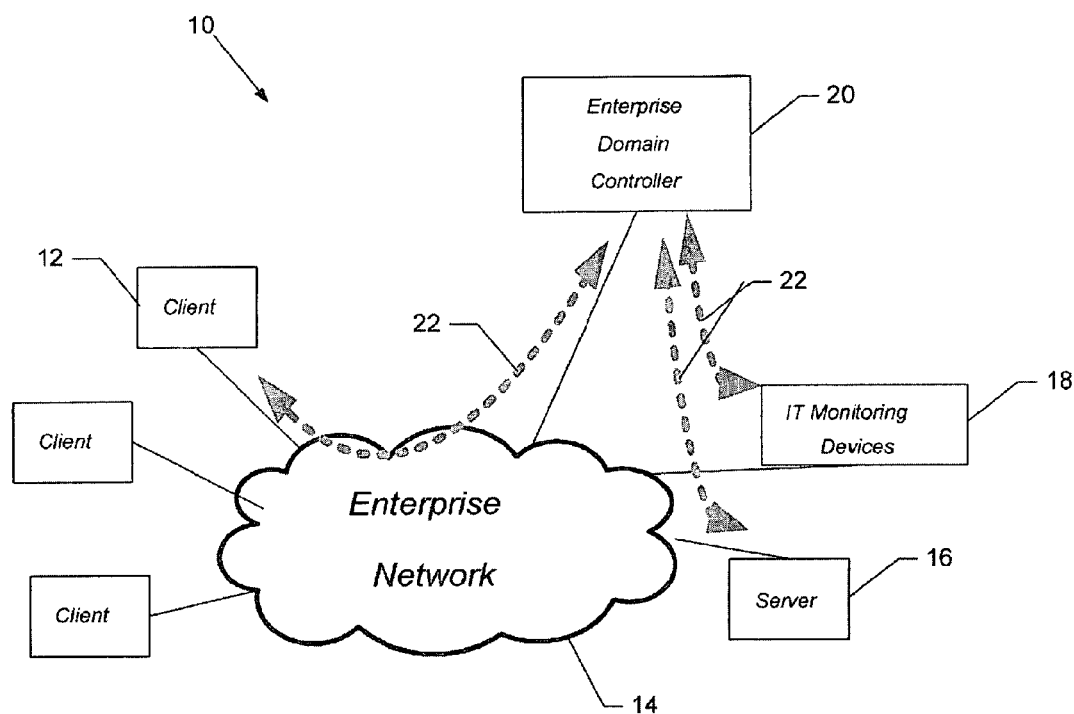
FIG. 1 is an enterprise network security diagram in accordance with various embodiments of the present invention.

Embodiments of the present invention provide for efficient key derivation for end-to-end network security with traffic visibility by authorized IT devices. Hardware-based, wire speed end-to-end encryption and authentication are achieved on a frame-by-frame basis using an efficient derived key mechanism for both small and large key sizes to address different security associations. As will be described below in more detail, for small keys e.g., 128-bit key), embodiments of the invention use the AES128 operation to derive the key, which has the advantage of shorter latency due to only 10-round operations in AES128. For larger keys, embodiments of the invention propose derivation formulas that enable the parallel execution of key derivation using the AES128 operation which can significantly speed up the key derivation of large keys (e.g., 256-bit key).

Clients and server communicate with a domain controller that grants derived keys and their associated derivation information to authenticated clients and derivation keys to authenticated servers. Upon receiving a frame from a particular client, server hardware extracts the key derivation information from the frame, applies the derivation key to this information, and thus, derives the cryptographic key used for the frame without having to look up or negotiate a session key. The derived key granted to one client will not be known to, and cannot be computed by, any other client. Only servers can derive the associated client keys. To solve the traffic visibility issue, the domain controller may also send the derivation key to authorized IT network appliances, such as, for example, an IT monitoring device/host. With the authorized IT network appliances having the same derivation key mechanism as the servers, the authorized IT network appliances are able to decrypt the encrypted pass-thru traffic at full wire speed, thus, enabling traffic visibility by the authorized IT network appliances.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. For the purpose of this application, the terms "frame" and "packet" may be considered interchangeable, unless the context clearly indicates otherwise.

FIG. 1 illustrates an enterprise network security diagram 10 in accordance with various embodiments of the invention. Referring to FIG. 1, an enterprise network 14 may be leveraged to communicate a plurality of clients 12 with one or more servers 16. An enterprise domain controller 20 is responsible for maintaining both end-to-end security for the entire enterprise and for maintaining traffic visibility for the server 16 and the IT monitoring devices 18. The domain controller 20 may be, for example, an authentication, authorization, and auditing (AAA) server, a key distribution server, or a policy server, to mention a few examples.

The enterprise domain controller 20 distributes derived keys (as indicated by arrows 22) to clients 12 and sends their derivation keys to server 16 and IT network monitoring host 18. As mentioned above, embodiments of the invention provide for an efficient derived key mechanism for both small and large key sizes to address different security associations. The client key or the derived key is derived based on the key size.

In embodiments, if the network security protocol employs the AES128 operation over the packets, then embodiments of the invention use the following derivation formula: client_key=AES128(base_key, client_ID), where the base_key is of size 128-bit; the client_ID is of size 128-bit; and the client_key is of size 128-bit. Here, the packet payload will undergo the 128-bit AES operation (i.e., 10 round AES operation) by the client_key. In embodiments, the client_ID is the identifier of clients, such as the client's Internet Protocol address or other designated identifier by the enterprise domain controller 20 or a combination of different attributes in the packet. This unique client_ID is communicated with each secure packet and is used as the secure session identifier. Therefore, each client 12 has different and independent keys and identifiers. In embodiments, base_key is stored in hardware.

In embodiments, if the network security protocol employs the AES 256 operation over the packets, then embodiments of the invention use the following optional derivation formulas:

Option 1: client_key_MSB=AES128(base_key_1, client_ID)   (1)

client_key_LSB=AES128(base_key_2,client_ID)   (2)

client_key=client_key_MSB‖client_key_LSB, where base_key_1 is of size 128-bit; base_key_2 is of size 128-bit; client_ID is of size 128-bit; and where "‖" denotes the concatenation operation, and thus client_key is of size 256-bit in length. Here, the 256-bit client_key will be used to do the cryptographic processing over the packet payload.

Option 2: client_key_MSB=AES128(base_key_1, client_ID)   (1)

client_key_LSB=AES128(base_key_2,client_ID+pad)   (2)

client_key=client_key_MSB‖client_key_LSB, where base_key_1 is of size 128-bit; base_key_2 is of size 128-bit; client_ID is of size 128-bit, pad is a fixed value (e.g., a counter or a specific string); and where "‖" denotes the concatenation operation, and thus client_key is of size 256-bit in length. Here, as with Option 1, the 256-bit client_key will be used to do the cryptographic processing over the packet payload. The pad value in Option 2 is a way of borrowing the idea in the well-established practice of key derivation function which uses a counter in input.

As described above with reference to the smaller key if the network security protocol employs the AES 128 operation over the packets, the client_ID with Options 1 and 2 is the identifier of clients, such as the client's Internet Protocol address or other designated identifier by the enterprise domain controller 20 or a combination of different attributes in the packet. This unique client_ID is communicated with each secure packet and is used as the secure session identifier. Therefore, each client 12 has different and independent keys and identifiers. In embodiments, base_key_1 and base_key_2 are stored in hardware.

As stated above, embodiments of the invention provide for an efficient derived key mechanism for both small and large key sizes to address different security associations (as opposed to traditional usage models of key derivation that involves a seed for a session to derive the keys for the session, for example). For small keys (e.g. 128-bit key), embodiments of the invention use the AES128 operation to derive the key, which has the advantage of shorter latency due to only 10-round operations in AES128. For large keys, embodiments of the invention propose derivation formulas that enable the parallel execution of key derivation using the AES128 operation which can significantly speed up the key derivation of large keys (e.g., 256-bit key).

In embodiments, it is assumed that we have a strong cryptographic key of 256-bit. In theory, the key is split into two halves and then combined back together to get back to the same value. Accordingly, the security of 256-bit entropy is preserved. Options 1 and 2 above are based on this same analogy. Here, in embodiments, the 256-bit key is split into two halves, and then a good pseudorandom function (e.g., AES 128) is applied to get two good derived keys. For example, base_key_1 and base_key_2 have 128-bit entropy, respectively. Then the two are combined together to obtain a strong key of 256-bit.

In embodiments, Options 1 and 2 above are efficient for even large key sizes because steps (1) and (2) in both Options 1 and 2 can be executed in parallel on hardware silicon. Thus, the latency of the key derivation is 10-round AES128 operations. For example, if 1-round operation costs 1 cycle of clock in hardware implementation, this will be 10 cycles. This is the best known method. Thus, in embodiments, the timing cost of the derivation for either small size or large size keys are the same. In addition, the increase of the silicon area is graceful for the large size key derivation, as embodiments of the invention only need the circuit of two rounds AES operation.

Figure 7:
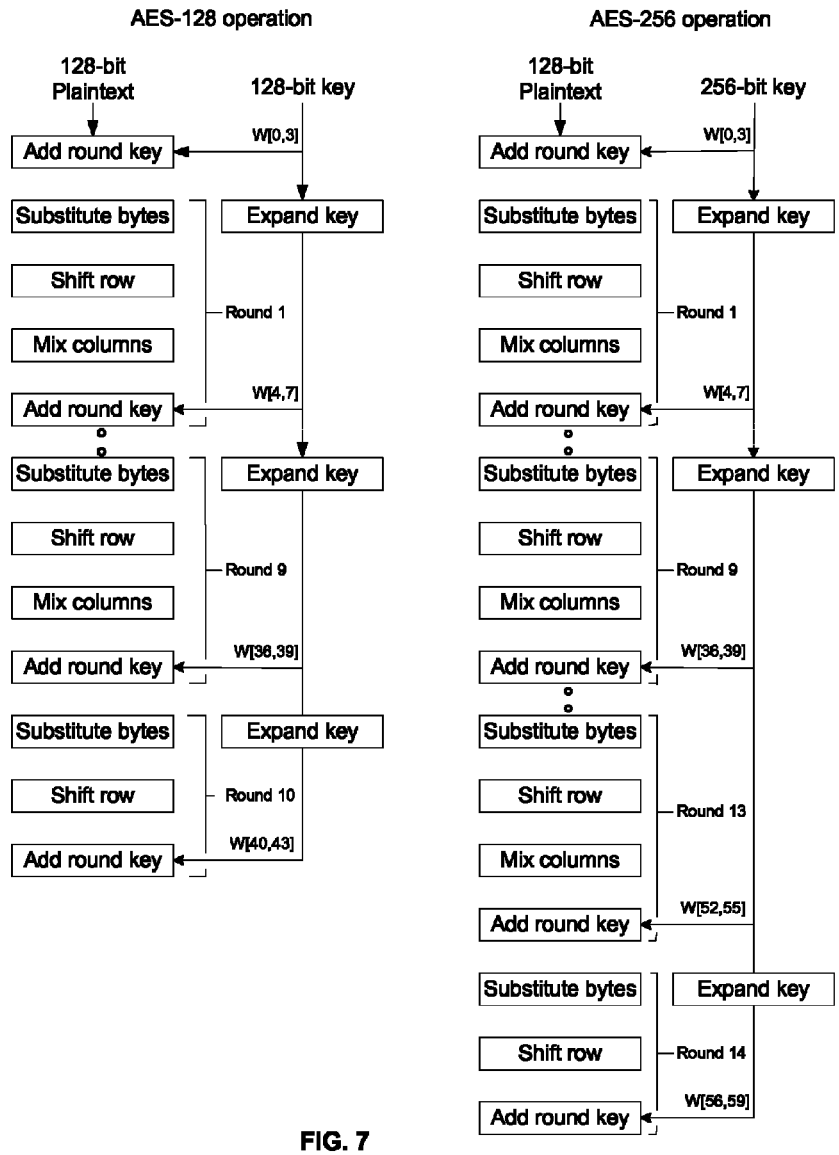
FIG. 7 depicts the AES128 and AES256 operations based on the NIST specification.

For large size keys, there is a savings of at least 4 cycles over other methods using the hash function or encryption primitive, which will have much longer latency. This is illustrated in FIG. 7. Referring to FIG. 7, FIG. 7 illustrates a block diagram for the AES128 and AES256 operations based on the NIST specification. Here, AES256 requires a large key size as well as more rounds for the operation. W[ . . . ] in the diagram specify each round key of 128-bit. Thus, embodiments of the invention use the AES128 operation to save 4 cycles in key derivation, as compared to the AES256 operation.

Figure 2:
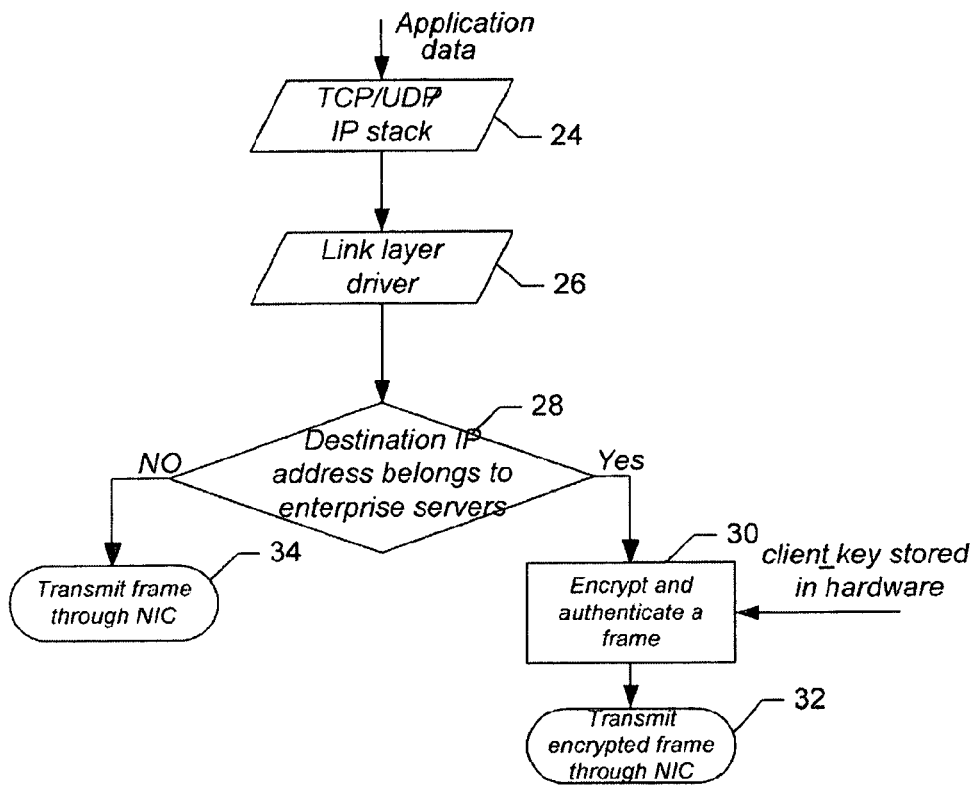
FIG. 2 is a depiction of a sequence on a client platform in accordance with various embodiments.

Referring to FIG. 2, a sequence of storing and applying one or more client_keys distributed by the domain controller 20 (FIG. 1) is depicted, according to embodiments. All of the outgoing frames to an enterprise server are encrypted and authenticated by the client_key. Initially, application data comes into a Transmission Control Protocol (TCP)/User Datagram Protocol (UDP)/Internet Protocol (IP) stack as indicated at 24. The Internet Protocol packets are distributed to a server by the stack. Then the link layer driver forms the layer-2 frame, as indicated at 26. A check at diamond 28 determines whether the destination Internet Protocol address belongs to enterprise servers. If not, the frame is transmitted through a network interface card as indicated at 34. If so, the frame is encrypted and authenticated, as indicated at 30, using the appropriate client_key stored in hardware. Then the encrypted frame is transmitted through the network interface card as indicated at 32.

Figure 3:
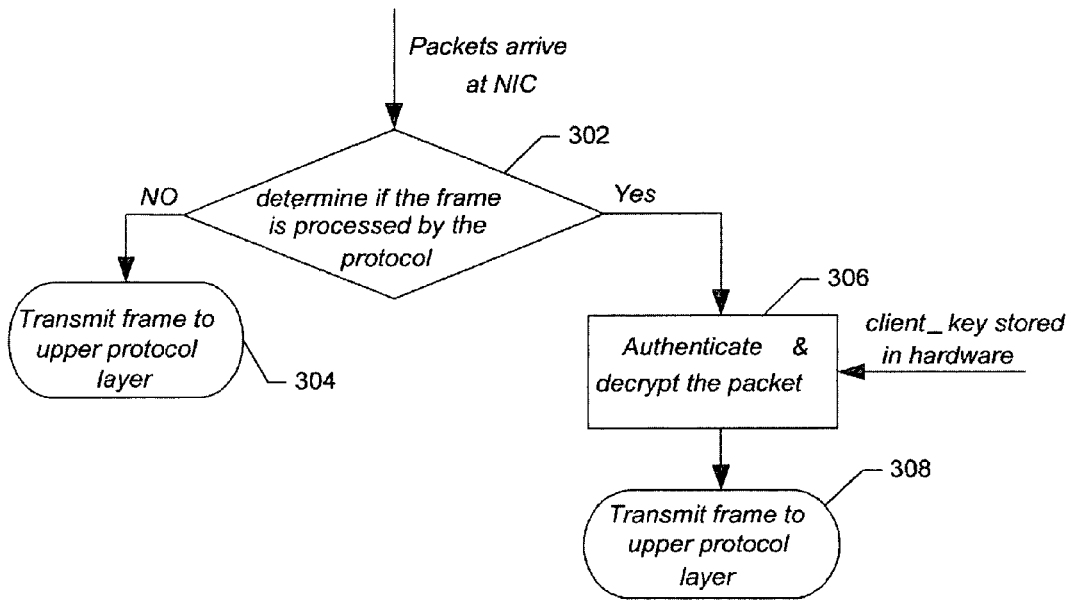
FIG. 3 is another client platform sequence in accordance with various embodiments.

Embodiments of the invention are further depicted in FIG. 3. When a client platform receives a frame, indicated as packets arrive at network interface card, a check at diamond 302, in FIG. 3, determines if the frame is processed by the protocol described herein. If not, the frame is transmitted to an upper protocol layer, as indicated at 304. If the frame is processed by the protocol at diamond 302, then the packet is authenticated and the packet is decrypted using the appropriate client_key stored in hardware, as indicated at block 306. The selection of the correct key can be done via leveraging the session ID and/or some other unique identifier or address within the packet. The frame is then transmitted to the upper protocol layer as indicated at 308.

Figure 4:
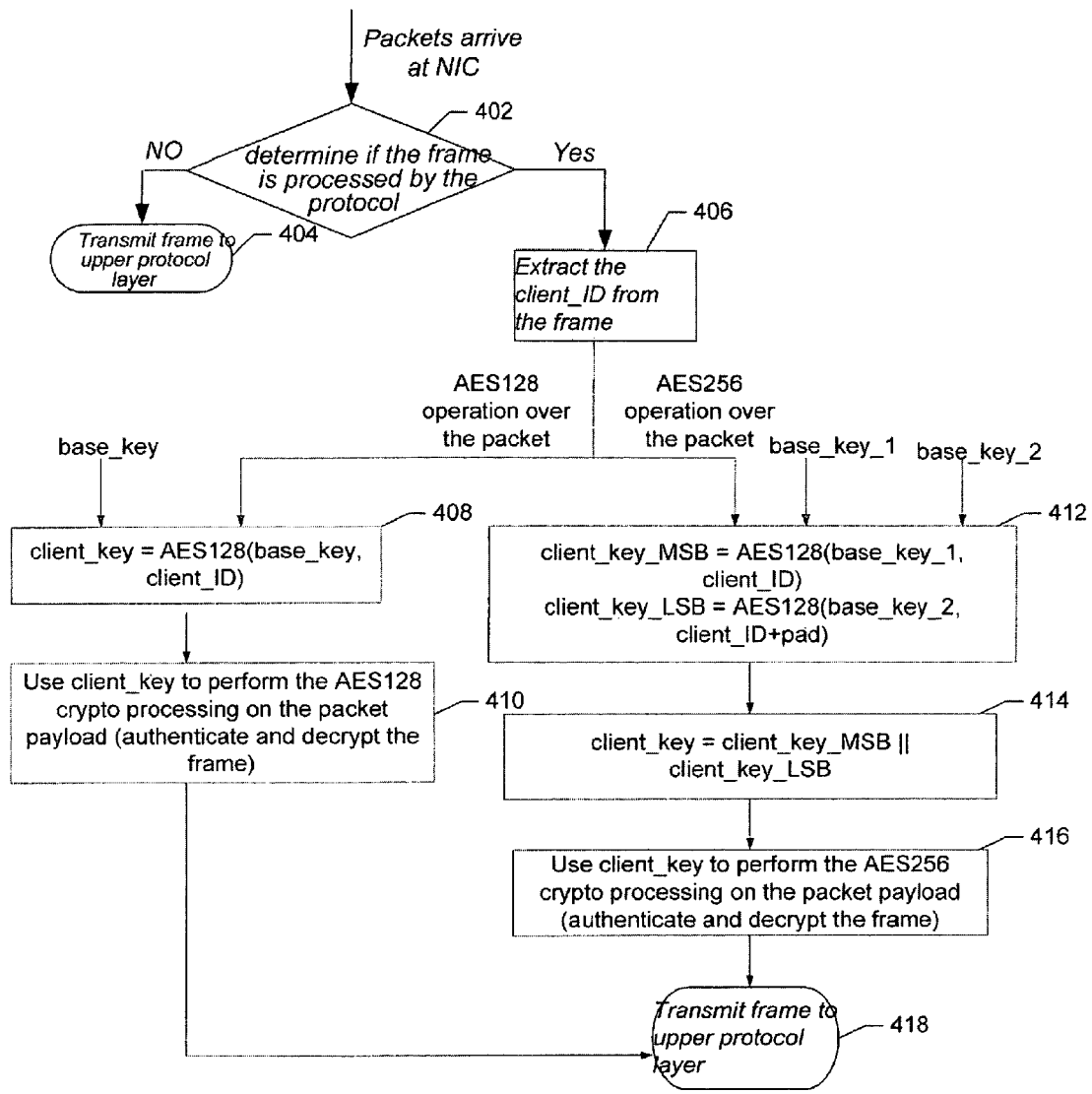
FIG. 4 is a server sequence in accordance with various embodiments.

Embodiments of the invention are further depicted in FIG. 4. Referring to FIG. 4, when the server 16 (FIG. 1) receives a frame, indicated as packets arriving in a network interface card, a check at diamond 402 determines if the frame is processed by the protocol described herein. If not, the frame is transmitted to the upper protocol layer as indicated at 404. If so, the client_ID is extracted from the frame at 406 and may be used to select the appropriate derivation key, if more than one derivation key exists.

If it is an AES128 operation over the packet, then client_key=AES128(base_key, client_ID) at 408. The client_key is used to perform the AES128 cryptographic processing on the packet payload to authenticate and decrypt the frame at 410. Finally, the frame is transmitted to an upper protocol layer at 418. In embodiments, the client_ID is the identifier for secure association for the given session.

If it is an AES256 operation over the packet, then client_key_MSB=AES128(base_key_1, client_ID) and client_key_LSB=AES128(base_key_2, client_ID+pad) at 412. As described above, these two derivation operations may be done in parallel using the AES128 operation which can significantly speed up the key derivation of large keys (e.g., 256-bit key). Note that 412 represents both Option 1 and Option 2, described above. For example, the "pad" value for computing client_key_LSB can be null (Option 1), or a simple integer counter (Option 2), or a prescribed string (Option 2).

Client_key=client_key_MSB||client_key_LSB at 414. The client_key is used to perform the AES256 cryptographic processing on the packet payload to authenticate and decrypt the frame at 416. Finally, the frame is transmitted to an upper protocol layer at 418. In embodiments, the client_ID is the identifier for secure association for the given session.

Figure 5:
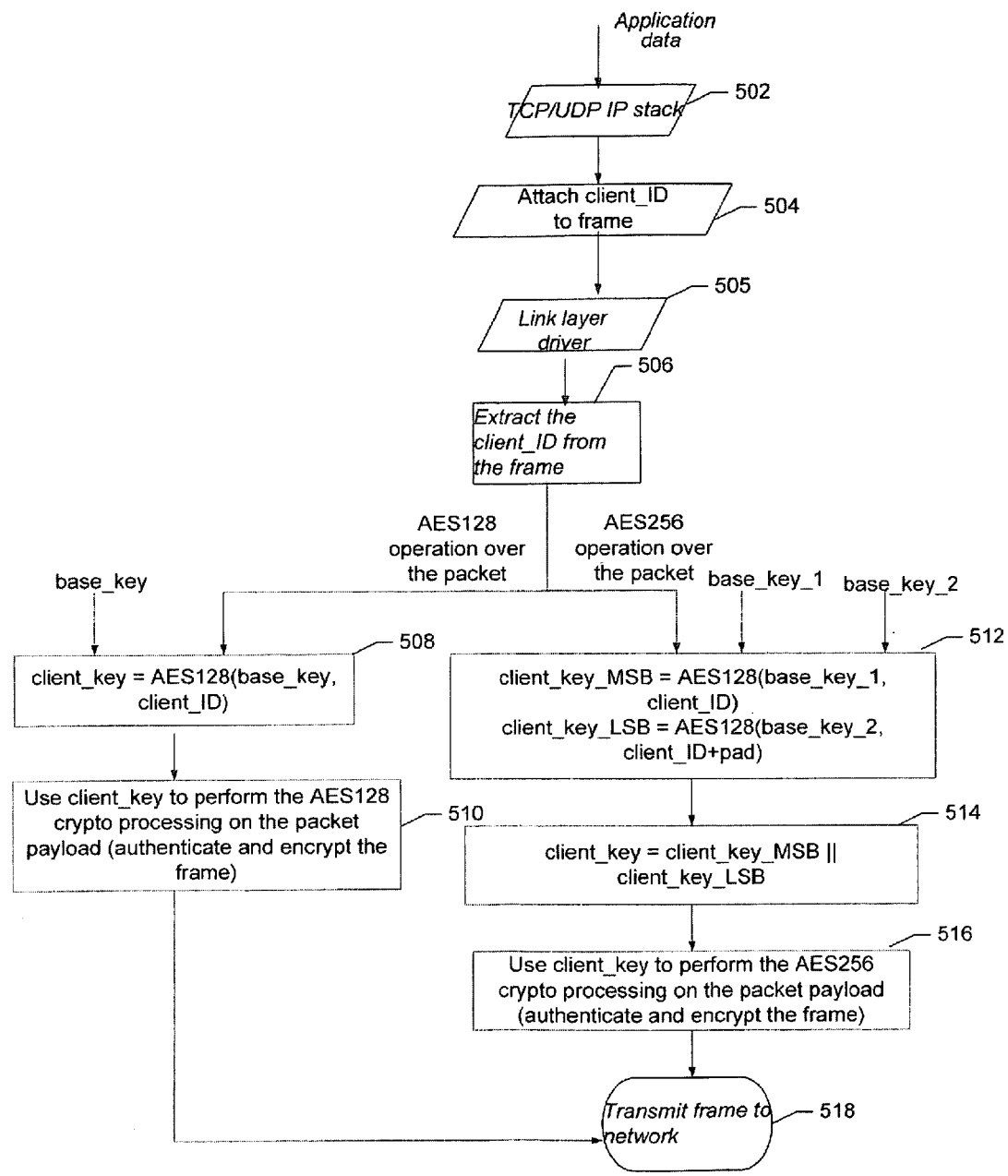
FIG. 5 is another sequence in accordance with various embodiments.

The server 16 (FIG. 1) may transmit a frame using the sequence shown in FIG. 5, according to embodiments. Referring to FIG. 5, application data is received in the Internet Protocol stack at 502. The packets are distributed to various clients and a client_ID is attached to each frame at 504. A link layer driver then receives a frame at 505. At block 506, the client_ID is extracted from the frame.

As above with reference to FIG. 4, if it is an AES128 operation over the packet, then client_key=AES128 (base_key, client_ID) at 508. The client_key is used to perform the AES128 cryptographic processing on the packet payload to authenticate and encrypt the frame at 510. Finally, the frame is transmitted to the network at 518. In embodiments, the client_ID is the identifier for secure association for the given session.

If it is an AES256 operation over the packet, then client_key_MSB=AES128(base_key_1, client_ID) and client_key_LSB=AES128(base_key_2, client_ID+pad) at 512. As described above, these two derivation operations may be done in parallel using the AES128 operation which can significantly speed up the key derivation of large keys (e.g., 256-bit key). Note that 512 represents both Option 1 and Option 2, described above. For example, the "pad" value for computing client_key_LSB can be null (Option 1), or a simple integer counter (Option 2), or a prescribed string (Option 2).

Client_key=client_key_MSB||client_key_LSB at 514. The client_key is used to perform the AES256 cryptographic processing on the packet payload to authenticate and encrypt the frame at 516. Finally, the frame is transmitted to the network at 518. In embodiments, the client_ID is the identifier for secure association for the given session.

The IT network monitoring devices 18 (FIG. 1) operate similarly to the server 16. The server 16 and the monitoring host 18 only need to maintain a few keys to handle many different security associations from clients. An adversary compromising one client host is not able to impersonate another client because the keys for distinct clients/sessions are different and independent. For the domain controller 20, the server 16, and monitoring devices 18, since the number of keys is relatively small, the keys can be stored in hardware, while still providing proper protection for tamper resistance.

In one embodiment, a frame format may piggyback the Internet Protocol security (IPSEC) frames. A client_ID is piggybacked on the security parameter index (SPI) field of an IPSEC header. A sequence number may also be piggybacked in the IPSEC header. Otherwise, the frame may be the same as a standard IPSEC frame.

The client_ID may be assigned by the domain controller and is independent from medium access control (MAC) or IP addresses, or all or part of the client_ID may also be provided by the client. For instance, the client_ID can contain the host and user information, which can be mapped to an associated access control policy. Therefore, the client_ID enables the IT administrator to better know where a packet originated.

In embodiments, both end-to-end security and traffic visibility for an enterprise network are provided. The mechanism may be implemented entirely in hardware, in some embodiments, which achieves full wire speed performance at lower cost in some cases.

In another embodiment, the generation of the client_ID and the client_key may be directly or indirectly bound to a prior evaluation of the device for conformance with a given administrative policy called a role. This evaluation may take various forms and in general speaks to a known configuration/state of the device. This allows the recipient of the data to make fine grained network access control decisions based on the last known/current state of the device. For example, the client_ID may be linked to a security level that defines the client's role and indicates what the client is authorized to access. The client_ID is linked to the client's role so that once the key and identifier are bound, additional access control and security functions are possible.

Figure 6:
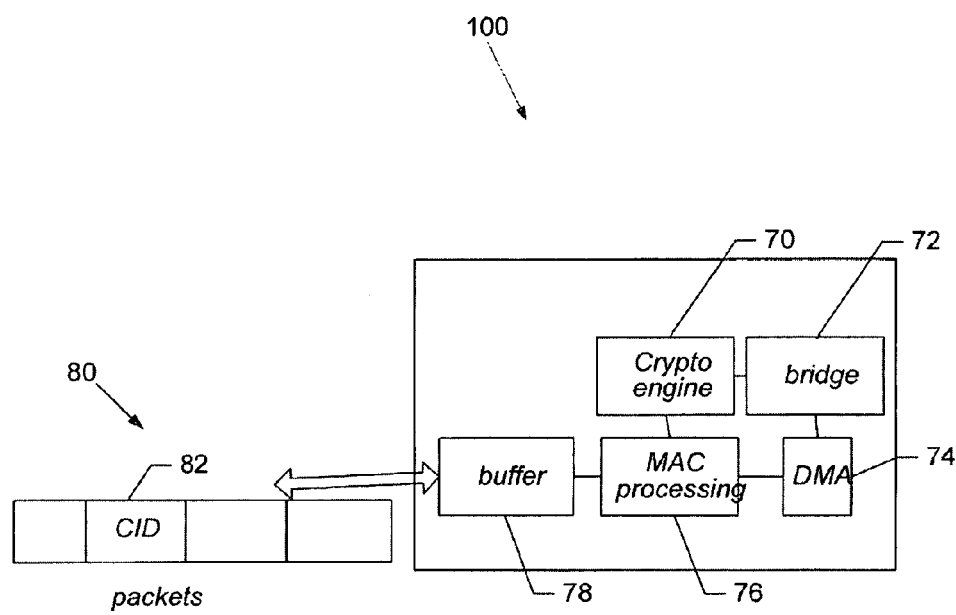
FIG. 6 is a hardware depiction in accordance with various embodiments.

Referring to FIG. 6, a hardware solution 100 includes a cryptographic engine 70 coupled to a bridge 72, according to embodiments. The bridge 72 is coupled to a direct memory access module 74, which, in turn, is coupled to a MAC processing unit 76. The processing unit 76 communicates with incoming and outgoing packets 80 through a buffer 78. The packets 80 may include the client_ID (CID) 82. Using the derived key approach eliminates the need for on-chip random access memory for session key storage.

In one embodiment, the hardware solution 100 may be part of a network interface card or part of an integrated MAC within a processor/chipset. As such, the burden of end-to-end security may be removed from the server 16, increasing the possible scale of the network 14 in some embodiments. This allows a seamless employment of the solution, without affecting higher layer protocols/applications, in some cases.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a cryptographic engine configured to derive a cryptographic client session key, client_key, for each of a plurality of clients using a derivation as follows:

$$\text{client\_key} = \text{client\_key\_MSB} \| \text{client\_key\_LSB},$$

where client_key_MSB is an n-bit output of a cryptographic operation using as inputs an n-bit first base key and a client ID, and
    client_key_LSB is an n-bit output of the cryptographic operation using as inputs an n-bit second base key, the client ID, and a pad,
    wherein the generation of client_key_MSB and the generation of client_key_LSB are executed in parallel; and
    a medium access control (MAC) processing unit coupled to the cryptographic engine,
    wherein the first and second base keys comprise derivation keys provided by a domain controller, the pad is one of a null value, a value of a counter, and a prescribed string, and $\|$ is a concatenation operation.

2. The system of claim 1, wherein the client ID is extracted from a frame received from a client.

3. The system of claim 1, including a domain controller to send a derivation key based on the derivation to an information technology monitoring device to enable the device to decrypt encrypted traffic to provide traffic visibility while maintaining end-to-end security.

4. The system of claim 1, wherein the system is part of a network interface card.

5. A method, comprising:
    providing network security between clients and a server using a domain controller to derive, by a cryptographic engine embodied in a processing system, a cryptographic client session key, client_key, for each client, using a derivation as follows:

$$\text{client\_key} = \text{client\_key\_MSB} \| \text{client\_key\_LSB},$$

where client_key_MSB is an n-bit output of a cryptographic operation using as inputs an n-bit first base key and a client ID, and
    client_key_LSB is an n-bit output of the cryptographic operation using as inputs an n-bit second base key, the client ID, and a pad,
    wherein the generation of client_key_MSB and the generation of client_key_LSB are executed in parallel, and
    wherein the first and second base keys comprise derivation keys provided by the domain controller, pad is one of a null value, a value of a counter, and a prescribed string, and II is a concatenation operation; and
    enabling the domain controller to distribute the client session key to a client, while delivering derivation keys to at least one of an information technology monitoring device and the server.

6. The method of claim 5, further comprising:
extracting the client ID from a frame received from a client.

7. The method of claim 6, further comprising:
sending a derivation key based on the derivation to an information technology monitoring device to enable the device to decrypt encrypted traffic to provide traffic visibility while maintaining end-to-end security.

8. The method of claim 7, further comprising:
using the client ID of a given session key to control network access.

9. The method of claim 5, further comprising:
binding the client ID to a security measurement for network access control.

10. A non-transitory machine-readable medium containing instructions which, when executed by a processing system, cause the processing system to perform instructions for:
providing network security between clients and a server using a domain controller to derive a cryptographic client session key, client_key, for each client using a derivation as follows:

client_key =client_key_MSB ∥client_key_LSB, where client_key_MSB is an n-bit output of a cryptographic operation using as inputs an n-bit first base key and a client ID, and
client_key_LSB is an n-bit output of the cryptographic operation using as inputs an n-bit second base key, the client ID, and a pad,
wherein the generation of client_key_MSB and the generation of client_key_LSB are executed in parallel, and
wherein the first and second base keys comprise derivation keys provided by the domain controller, pad is one of a null value, a value of a counter, and a prescribed string, and μ is a concatenation operation; and
enabling the domain controller to distribute the client session key to a client, while delivering derivation keys to at least one of an information technology monitoring device and the server.

11. The machine-readable medium of claim 10, further comprising:
storing instructions to extract the client ID from a frame received from a client.

12. The machine-readable medium of claim 11, further comprising:
storing instructions to send a derivation key based on the derivation to an information technology monitoring device to enable the device to decrypt encrypted traffic to provide traffic visibility while maintaining end-to-end security.

13. The machine-readable medium of claim 10, further comprising:
storing instructions to use the client ID of a given session key to control network access.

* * * * *